Feb. 20, 1968   D. S. PERRY ET AL   3,369,851
EXPANDABLE MOLDED PLASTIC JOURNAL
Filed Oct. 15, 1965   2 Sheets-Sheet 1

INVENTORS.
DONALD S. PERRY
JAMES A. PURDY
BY
Souther, Stoltenberg & Barr
ATTORNEYS 3,369,851
EXPANDABLE MOLDED PLASTIC JOURNAL
Donald S. Perry and James A. Purdy, Fayetteville, N.Y., assignors to Eltra Corporation, Brooklyn, N.Y., a corporation of New York
Filed Oct. 15, 1965, Ser. No. 496,300
7 Claims. (Cl. 308—237)

ABSTRACT OF THE DISCLOSURE

A rotatable plastic journal capable of maintaining a maximum dimension of an outer bearing surface under varying temperature conditions by providing longitudinal internal cavities oppositely disposed and communicating with a longitudinal opening with an integral longitudinal tower element projecting into the opening to limit movement of the cavity walls into the opening.

---

Figure 1:
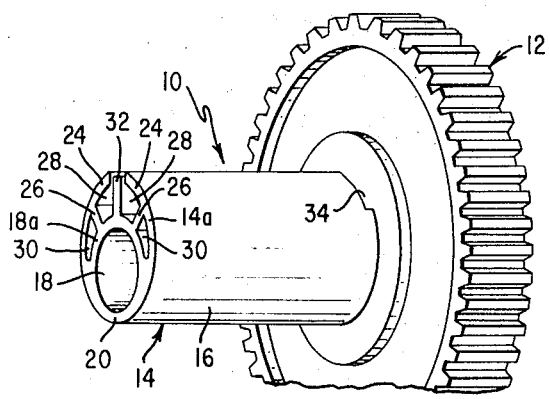

This invention relates to a molded plastic journal and more particularly to an expandable molded plastic journal. While the invention is disclosed as being an integral portion of a molded plastic worm gear for use in an electric windshield wiper drive mechanism, it is capable of being used in various other mechanisms whereby the principle disclosed herein could be adapted to replace more expensive metal bearing or journal structures.

In recent years plastics have been used quite extensively to replace metal when producing molded parts such as gears, bearings, etc. in an effort to reduce overall manufacturing costs and in many instances to increase surface wearing life in certain areas of mechanisms provided with such parts, particularly bearing surfaces. Although the use of plastics has solved some problems, plastics presently available and generally suitable for certain parts have inherent characteristics which present another problem. The problem is the inability to maintain certain given dimensions because of the expansion and contraction characteristics which occur under varying temperature conditions. These characteristics are evident in the molding process and also during operation of the part in a mechanism. In known plastics this problem is overcome since the expansion and contraction dimensions for a given volume of material in a given structure or portion of a structure can be determined and is exact. In view of this a principal object of the instant disclosure is concerned with the outside diameter of a rotatable plastic journal, and particularly a means of maintaining a maximum outer bearing surface during rotation of the journal, the journal in this case being an integral portion of a rotatable worm gear.

It is another object of this invention to provide an improved molded plastic journal structure for a rotatable journal which will obviate the expansion and contraction problems that occur when using plastics for such a part.

Another object of this invention is to provide an improved molded plastic journal structure for the purpose disclosed herein which will provide a maximum outer bearing surface during rotation of the journal to thereby maintain a rotatable shaft journaled therein in a given spaced relation under varying temperature conditions that occur during operation of the part.

Another object of this invention is to provide an improved molded plastic shaft structure which will provide a maximum outer bearing surface when rotatably journaled in a metal bearing.

Still another object of this invention is to provide an improved molded plastic journal structure as disclosed herein whereby additional spring means can be assembled in the structure to thereby insure certain operation characteristics during extremely high temperature conditions.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Figure 2:
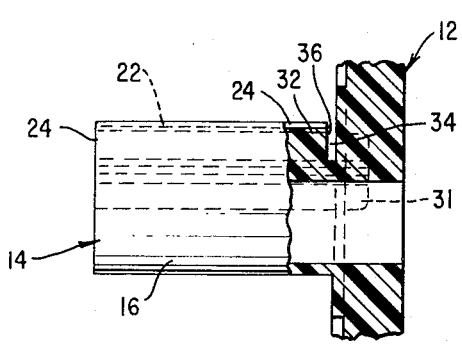
Figure 3:
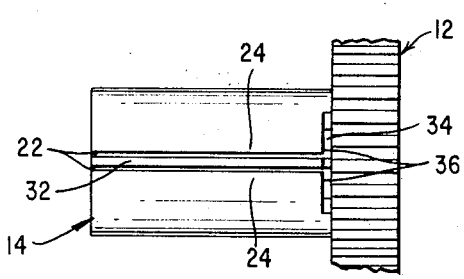
Figure 4:
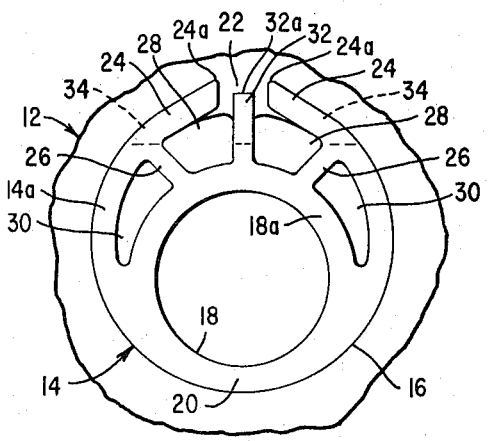
Figure 5:
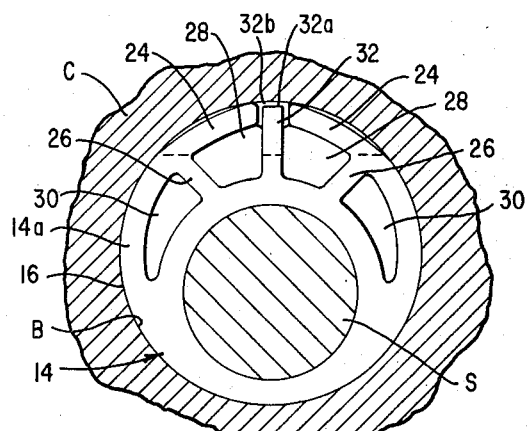
Figure 6:
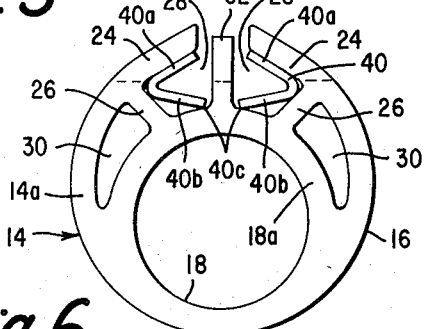
Figure 7:
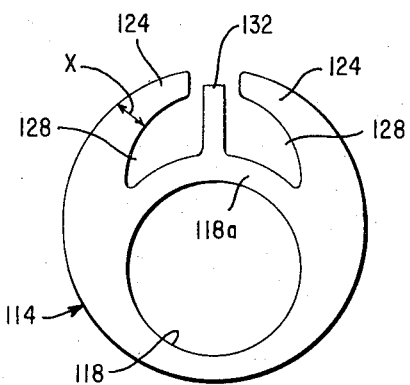
Figure 8:
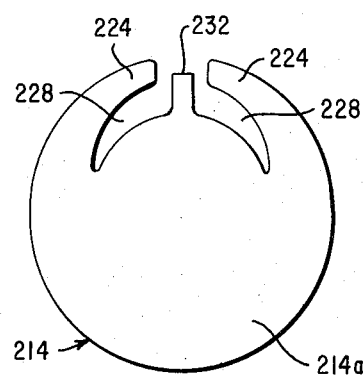

Referring to the drawings:

FIG. 1 is an isometric view partly broken away which shows an expandable journal structure incorporated in an integral shaft portion of a worm gear, FIG. 2 is a side elevational view, with relation to FIG. 1, partly broken away and partly in section showing details of the invention, FIG. 3 is a top plan view, with relation to FIG. 1, partly broken away showing additional details of the invention, FIG. 4 is an end elevation of the journal, FIG. 5 is an end view partly in section showing the relation of the journal, a rotatable shaft, and a casting in which the journal is rotatably positioned, FIG. 6 is an end view showing an alternate form of the invention, FIG. 7 is an end view showing another alternate form of the invention, and FIG. 8 is an end view showing the principle of the invention as applied to a rotatable shaft as such rather than a journal.

In the drawings, particularly FIG. 1, a molded structure 10 is shown comprising a worm gear portion 12 and an integral hub or shaft portion 14. The structure is formed of a synthetic plastic material such as that sold under the trade names of "nylon," "Delrin," or the like which are plastics generally acceptable for molding structures of this type.

The important feature of the invention is the structural configuration of the portion 14 which will be referred to hereinafter as a journal. The journal comprises an outer bearing surface 16 and an inner bearing structure 18. The bearing 18 is an integral portion of the journal which accommodates a rotatable shaft S (FIG. 5) which is a crank drive member of a windshield wiper mechanism and cooperates with the device 10 during operation. In the structure a longitudinal center of the bearing 18 is so spaced from a longitudinal center of the journal that a portion of a wall 18a of the bearing 18 is an integral portion of a wall 14a of the journal as at 20. The arrangement provides an eccentric relation between the bearings.

The journal wall 14a does not form a true closed cylinder as it is open longitudinally at 22 (FIGS. 2, 3, and 4) to provide two oppositely disposed wing-like projecting portions which will be further described hereinafter. The opening 22 is diametrically opposite the intersection 20 of the walls 14a and 18a thereby providing a symmetrical structure as viewed from the outboard end of the journal.

A greater portion of the wall 14a, with the exception of the projections 24, is maintained substantially cylindrical by two angularly disposed walls 26 which are integral with the walls 14a and 18a. On either side of the walls 26 are cavities 28 and 30 which project longitudinally through the journal and partly into the gear portion 12, as at 31 (FIG. 2). A third wall 32 is provided in the journal which will be referred to hereinafter as a tower. The tower is integral with the bearing wall 18a and projects diametrically into the opening 22 in such a fashion as to be centrally positioned with relation to the parallel edges of the projections 24. The tower is formed so that its radial length is slightly less than the fixed radius of the journal, the purpose for which will be better understood hereinafter.

The wing-like projections 24 are formed relatively flat and project from the walls 14a so that their free ends terminate at the longitudinal opening 22 and their outer longitudinal edges 24a are beyond a circumferential line of the surface 16 of the journal. This also positions the edges 24a radially beyond an edge 32a of the tower 32 as viewed in FIG. 4. To carry out the invention, it is necessary that the wing-like projections be flexible and that the degree of flexibility be such that a constant interference exists between the projections and a relative bearing surface. To accomplish this, it is necessary to provide a transverse slot 34 (FIGS. 2 and 3) through the journal to free both ends 36 of the flexible projections from the gear portion 12.

In use, as shown in FIG. 5 the journal is rotatably positioned in a bore B which in the instant disclosure is provided in a cast windshield wiper gear box C, only a portion of which is shown. As can be seen in the drawing the major portion of the bearing surface 16 of the journal is in contact with the bearing surface of the bore B. This is made possible, first, by the fact that there is a deliberate and continuous interference between the wing-like projections and the surface of the bore B thus urging the journal against the major portion of the bore surface. Second, the cavities 30 are provided so that the wall portions 14a adjacent the cavities are of a relatively uniform thickness and thus sufficiently flexible to conform to the bore surface. Finally, the fact that the device is formed of a suitable plastic material provides that maximum flexibility is inherent in the structure to allow the major portion of the journal to conform to the major portion of the bore B.

An initial advantage of the device is that oversize, elliptical, and the like, irregularities in the structure may be manually overcome when assembling the device in the casting bore. These irregularities sometimes develop in a plastic structure after it is removed from a mold, an undesirable characteristic well known to those experienced in the art. Another advantage exists during operation of the device and that is an inherent preloaded characteristic in the wing-like projections which provides a constant bearing between the projections and the bore surface during normal running conditions. The preloaded characteristic is partly the result of the configuration and relative positions of the projections with relation to the main body portion of the journal. Still another advantage of the structure is the fact that the wing-like projections flex, thus providing a means of compensating for temperature responsive expansion and contraction characteristics of the plastic material that occur when the journal is rotated in the bore at various speeds, or in various environmental temperature conditions.

To provide against extreme inward flexure of the wing-like projections, which would result in eccentricity between the axis of the journal and the axis of the bore B, the tower 32 is included in the structure. The radial length of the tower is so calculated that when extremely high temperature conditions exist during operation, radial expansion of the main body of the journal will cause the wing-like projections to flex inwardly until the longitudinal edge 32a of the tower contacts the bearing surface of the bore. In the drawing (FIG. 5) the radial length of the tower is shown as being slightly less than the radius of the bore, the clearance 32b therebetween allowing for maximum temperature expansion.

The tower is also necessary in the structure to provide a positive stop or bearing surface during heavy load conditions, such as snow removal or the like, which could cause extreme eccentricity and eventual damage to related parts. In other words, the tower acts as a travel limitation during operation to prevent extreme radial displacement of the journal and maintain substantially constant concentricity between the outer surface of the journal and the inner surface of the bore should a high temperature condition exist, or a heavy load condition exist.

FIG. 6 illustrates a modified form of the invention in which like reference numbers refer to a journal structure identical to that already described. In the modified form additional means are shown which might be useful under adverse conditions to increase the tension characteristics of the wing-like projections 24. The additional means comprises two longitudinal V-shaped steel spring members 40 which are identical in configuration and size. They are positioned in an oppositely disposed manner in the cavities 28 in such a fashion that both of the legs 40a and 40b of each member 40 are projecting toward the tower 32. In the drawing the legs 40a are shown as being in planar contact with the inside surface of the projections 24 while terminal edges 40c of the legs 40b are in contact with the bearing wall 18a. In this form a greater control of the angular range through which the projections 24 flex is provided since the members 40 will tend to resist extreme flexure of the projections when the main body portion of the journal expands or is displaced radially as a result of a load condition.

In FIG. 7 an alternate form 114 of the invention is shown which has incorporated therein an inner bearing 118, oppositely disposed cavities 128, a bearing wall 118a, a tower 132, and wing-like projections 124. In this form the bearing portion 118, bearing wall 118a, and the tower 132 are identical to like portions shown in FIGS. 1–5. The main difference is that the wing-like projections 124 have a substantially tapered arcuate configuration providing a varying cross section, as at X, the length of which decreases toward the free ends of the projections. The tapered configuration provides a gradual flexure according to stress in the projections during various temperature conditions. This form eliminates the cavities 30 and walls 26 shown in the prior form, although the prior form could be combined with the taper principle. In either case the edges and operational characteristics of the structure is the same as described hereinbefore.

The principle of the invention should not be limited to a journal structure as that thus far described. The same principle is adaptable to a force transmitting rotatable shaft or bearing, as shown in FIG. 8, which would not necessarily include means for journaling an additional shaft. In FIG. 8 an end view of a shaft 214 is shown which includes the essential features of the invention, namely, a main body portion 214a, a tower 232, and oppositely disposed wing-like projections 224, all of which are defined by oppositely disposed cavities 228. This structure is somewhat similar to that shown in FIG. 7 in that the wing-like projections 224 have a tapered arcuate configuration. This concept should not be limited as such since a shaft could be molded to resemble the structure shown in FIGS. 1–5 or a combination thereof but would not include the bearing portion 18. During operation of the shaft the function is again the same as that of the other forms thus far described, i.e., the wing-like projections 224 provide a deliberate and continuous interference between the shaft and an inner bore surface (not shown) in which the shaft would be journaled, and the tower 232 provides a travel limitation to maintain substantially constant concentric rotation of the shaft within its journal.

It is to be understood that the above-detailed description of the present invention is intended to disclose an embodiment thereof to those skilled in the art, but that the invention is not to be construed as limited in its application of the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond requirements of the prior art.

What is claimed is:

1. An expandable rotatable journal comprising an outer journal wall having an outer bearing surface, and a diametrically smaller inner bearing wall having an inner bearing surface; a portion of said inner bearing wall being integral with a portion of said outer bearing wall at a point where both walls are tangent to each other, said outer wall having a longitudinal opening therein at a point diametrically opposite said tangent point; said journal including longitudinal cavities therethrough defining two longitudinal angularly disposed walls integral with both of said bearing walls, a longitudinal tower integral with said inner bearing wall and projecting into said longitudinal opening in said outer wall; flexible portions of said outer wall adjacent said longitudinal opening projecting beyond an outer circumferential surface of said outer wall to thereby define oppositely disposed wing-like projections, said tower providing a travel limitation to contact a bearing surface when said wing-like projections flex inwardly responsive to radial displacement of said journal.

2. An expandable rotatable journal according to claim 1 in which said wing-like projections have outer longitudinal edges that terminate slightly beyond a radial length of said tower.

3. An expandable rotatable journal according to claim 1 in which said tower has a radial length which is slightly less than the radius of the main body of the journal.

4. An expandable rotatable journal comprising an outer bearing wall, and an inner bearing wall, said outer wall having a longitudinal opening therein, said journal including longitudinal cavities therethrough defining two longitudinal angularly disposed walls integral with both of said bearing walls, and a longitudinal tower integral with said inner bearing wall and projecting into said longitudinal opening in said outer wall; flexible portions of said outer wall adjacent said longitudinal opening projecting beyond an outer circumferential surface of said outer wall to thereby define oppositely disposed wing-like projections, said tower providing a travel limitation to contact a bearing surface when said wing-like projections flex inwardly responsive to radial displacement of said journal.

5. An expandable rotatable journal according to claim 1 in which said wing-like projections have a tapering configuration providing a varying cross section which decreases toward the free end of the projections, said taper providing a gradual flexure of said wing-like projections according to stress responsive to radial displacement of said journal.

6. An expandable rotatable journal according to claim 1 in which two oppositely disposed cavities in communication with said longitudinal opening have inserted therein additional spring means in contact with said wing-like projections to thereby increase tension characteristics of the wing-like projections.

7. An expandable rotatable shaft comprising a main body portion, an outer bearing surface, a longitudinal opening in said bearing surface, two oppositely disposed longitudinal cavities through said body portion and in communication with said longitudinal opening, a longitudinal tower integral with said body portion and projecting into said longitudinal opening, said cavities defining two oppositely disposed flexible wing-like projections which project beyond an outer circumferential surface of said main body portion and terminate at said longitudinal opening, said tower providing a travel limitation to contact a bearing surface when said wing-like projections flex inwardly responsive to radial displacement of said main body portion.

References Cited
UNITED STATES PATENTS

| | | | |
|---|---|---|---|
| 523,238 | 7/1894 | Rarig | 308—237 X |
| 798,476 | 8/1905 | Worrest | 308—17 |
| 1,182,529 | 5/1916 | Dinkel | 308—237 X |
| 2,648,247 | 8/1953 | Schmuziger. | |
| 2,675,283 | 4/1954 | Thomson. | |
| 2,835,540 | 5/1958 | Jorgensen | 308—238 X |

FREDERICK L. MATTESON, JR., *Primary Examiner.*

ROBERT A. DUA, *Examiner.*